Sept. 28, 1937.   R. A. CARLSON   2,094,526
TWO-FEED CONTROL MECHANISM FOR HYDRAULICALLY OPERATED MACHINE TOOLS
Original Filed March 27, 1931   3 Sheets-Sheet 1

Inventor:
Raymond A. Carlson
By Wilson, Dowell,
McCanna & Wintercorn
Attys.

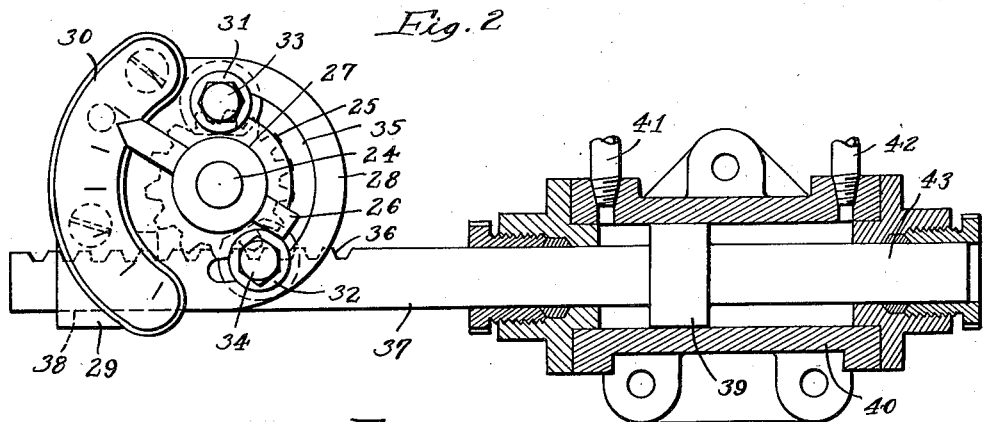
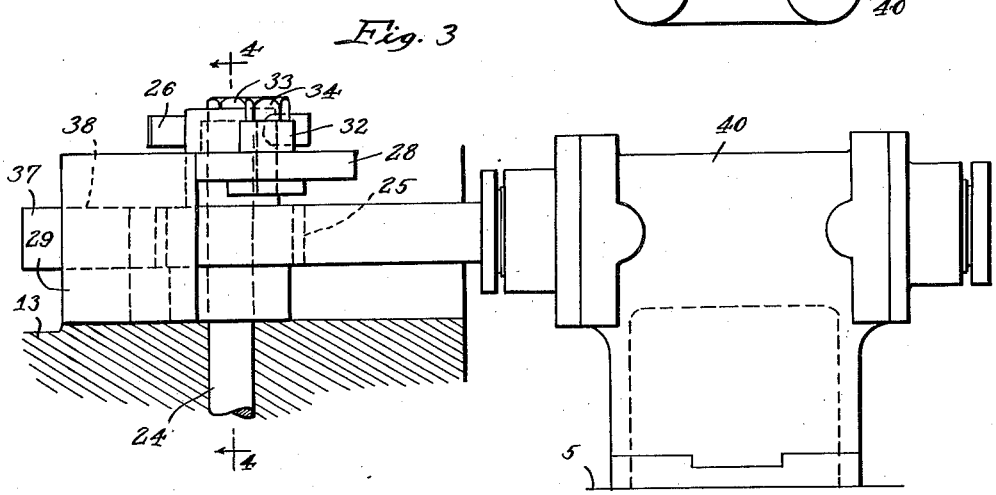
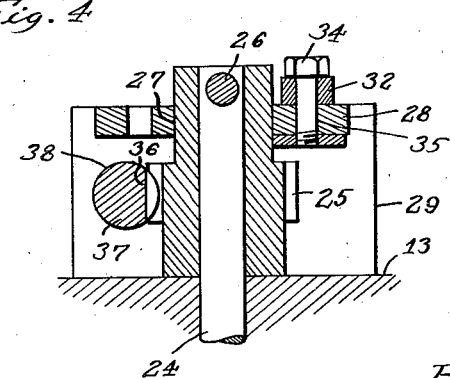

Sept. 28, 1937. R. A. CARLSON 2,094,526
TWO-FEED CONTROL MECHANISM FOR HYDRAULICALLY OPERATED MACHINE TOOLS
Original Filed March 27, 1931 3 Sheets-Sheet 3
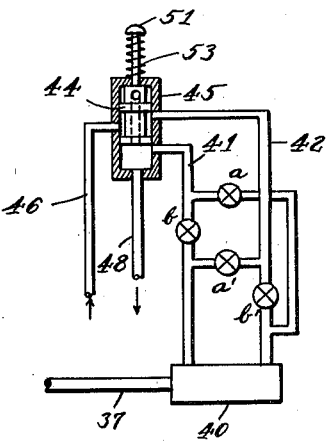
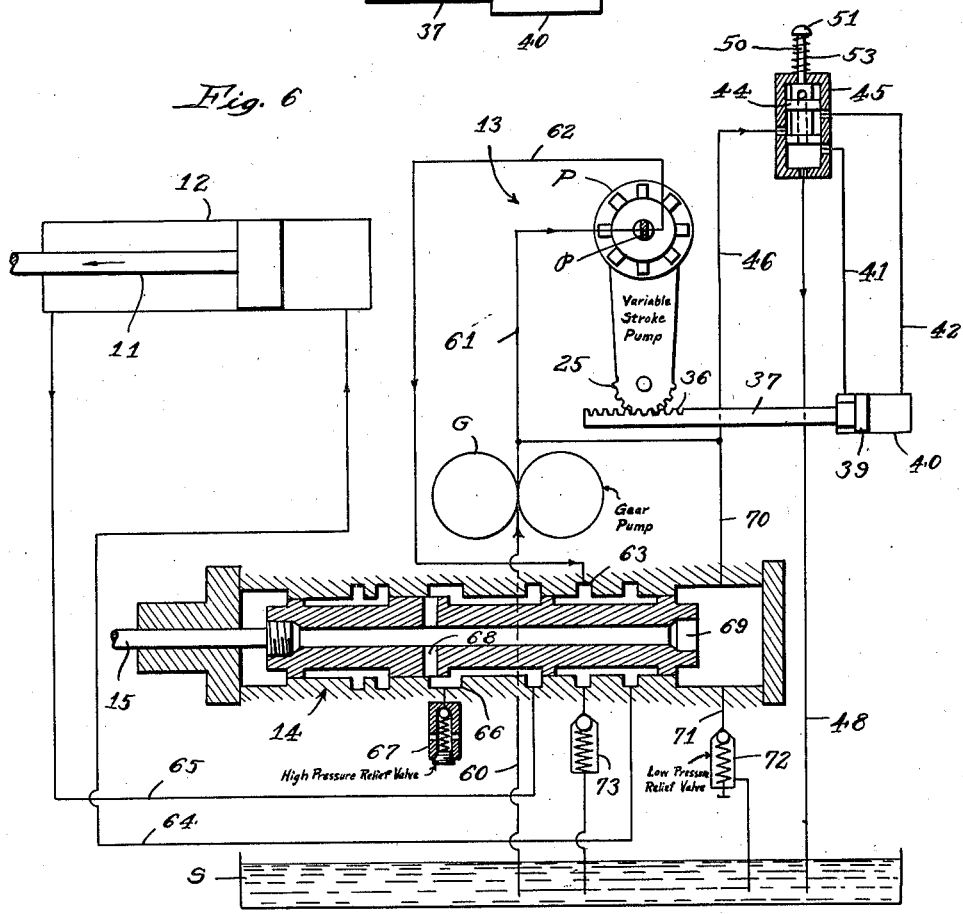

Patented Sept. 28, 1937

2,094,526

UNITED STATES PATENT OFFICE 2,094,526

TWO-FEED CONTROL MECHANISM FOR HYDRAULICALLY OPERATED MACHINE TOOLS

Raymond A. Carlson, Rockford, Ill., assignor, by mesne assignments, to Borg-Warner Corporation, Chicago, Ill., a corporation of Illinois Original application March 27, 1931, Serial No. 525,655. Divided and this application December 21, 1934, Serial No. 758,589

9 Claims. (Cl. 60—52)

This invention relates to hydraulically operated machine tools generally, and is particularly concerned with a two-feed control mechanism.

Pumps utilized in the hydraulic operation of machine tools are controlled usually by the shifting of a valve known as a pilot valve, to secure the well known cycles. It has been the practice heretofore to provide specially constructed pumps to fulfill the requirements of any desired cycle. This, however, gave rise to considerable expense in the construction of pumps especially where the cycles are a trifle more complicated, as, for example, where slow and fast feed is desired both in forward and reverse travel. It is, therefore, the principal object of my invention to utilize in connection with one of the simpler and less expensive forms of pumps a control mechanism, inexpensive in itself, which coupled with the control functions secured by the shifting of the pilot valve of the pump itself enables a cycle involving slow and fast feeds in both directions, at a considerable saving in cost over what might possibly be worked out all in a pump itself.

In accordance with my invention, I provide in connection with a pump on which there is otherwise utilized a manual adjustment for selecting any fixed feed, a mechanism controlled suitably by dogs in the movement of the head or carriage to shift the pump part that would otherwise be manually operable, from a slow feed position to a fast feed position, or vice versa, at points in the cycle of movement of the head or carriage as determined by the setting of dogs.

Another object of my invention consists in providing a hydraulically operated piston for shifting the pump part from one position to the other, and adjustable stops to determine the extent of movement of the pump part, whereby to provide a variable low rate and a variable high rate of feed, as desired.

This application is a division of my copending application, Serial No. 525,655, filed March 27, 1931.

The invention is illustrated in the accompanying drawings, in which—

Fig. 2 is an enlarged detail partly in front elevation and partly in vertical section of the main part of said mechanism;

Fig. 3 is a view of Fig. 2 looking from below;

Fig. 4 is a cross-section on the line 4—4 of Fig. 3;

Fig. 5 is a view corresponding to a portion of Figure 1 showing a modification, and Fig. 6 is a fluid circuit diagram for the machine.

The same reference numerals are applied to corresponding parts throughout the views.

Figure 1:
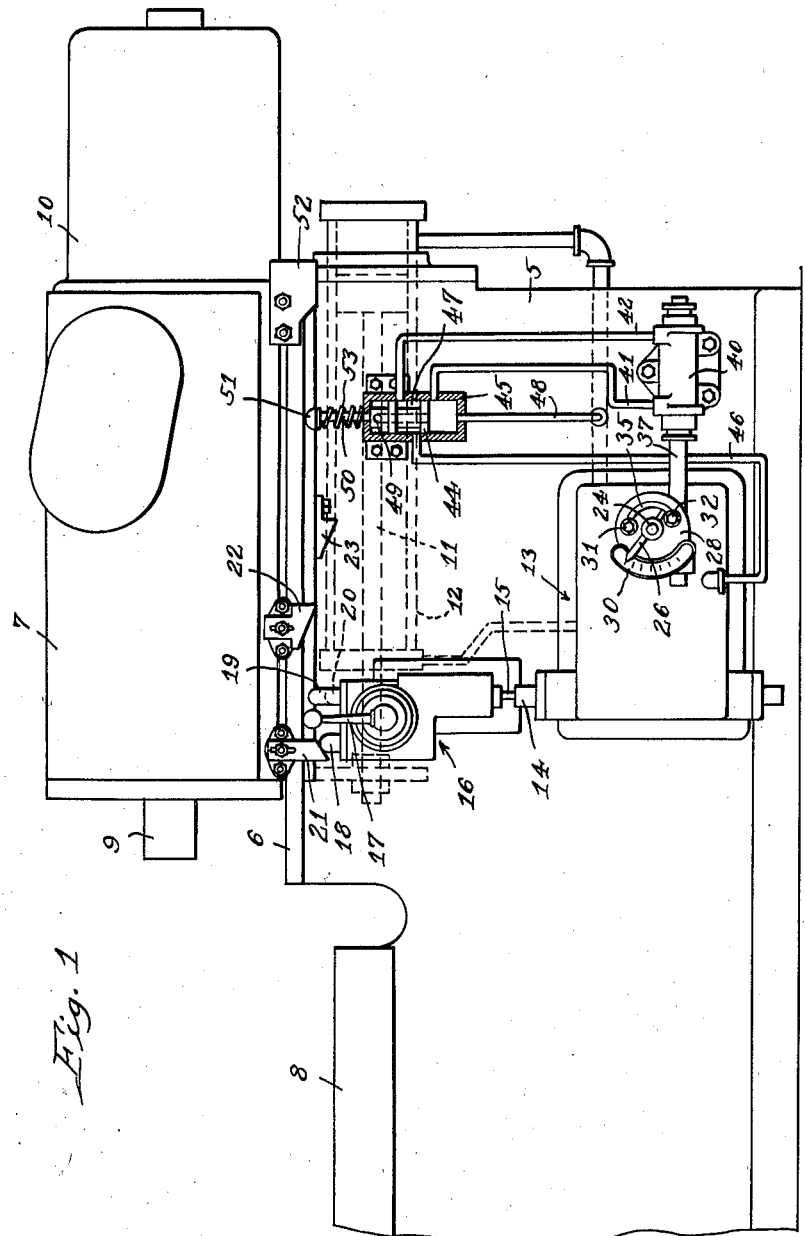
Figure 1 is a front view of a horizontal drilling, reaming or boring machine showing the two-feed control mechanism of my invention applied thereto.

Referring to Fig. 1, the numeral 5 designates the bed of the machine having ways 6 thereon for reciprocation of the head or carriage 7 toward and away from the work carried on the table 8. The view shows a single head with a single spindle 9 thereon, but it should be understood that the number of spindles is unimportant so far as the present invention is concerned and the machine may be of a double end, three-way, or other type, and could be of a vertical type instead of horizontal. The head 7 is illustrated as self-contained, having the electric motor 10 mounted directly thereon for driving the spindle. The head 7 is arranged to be reciprocated in the usual way by means of a ram 11 operating in a hydraulic cylinder 12, the opposite ends of which are connected with a pump 13. In some machines the cylinder may be mounted on the head and the ram fixed to the bed or column on which the head operates. In any event, however, the pump is connected with opposite ends of the cylinder and the delivery of the pump is controlled by means of a valve or valves to provide for rapid traverse or feed movements of the head. Now, as indicated before, the pump 13 would, in accordance with previous practice, be of special construction in and of itself to take care of the complete cycle desired, irrespective of the complications in construction and attendant expense that might be entailed in order to secure the desired cycle. I have departed from this practice in accordance with the present invention, as will be brought out more fully hereinafter by the provision of extraneous or outside control mechanism in conjunction with a fairly simple and economical style of pump. To be specific, the pump shown is an Oilgear QS pump, such as is disclosed in Ferris Patents #1,753,562 and 1,854,127. This pump has a pilot valve 14 built into it having a reciprocable stem or control member 15 movable endwise to different positions to provide for a cycle of rapid traverse forward, feed forward and return feed and quick return, or slight variations of this cycle. It should be understood, however, that no limitation is to be regarded as imposed upon the application of my invention by reason of reference to this particular style of pump and valve, inasmuch as the invention is applicable to use with any variable displacement pump and suitable control valve therefor.

The control box or unit 16 contains means for shifting the valve stem 15 endwise and forms the subject matter of my copending application Serial No. 340,208, filed February 15, 1929, since issued into Patent #1,994,463. As described in said application, the hand lever 17 has connection with a pinion disposed between two racks on one of which is mounted a plunger 18 and on the other a plunger 19, so that as one plunger is raised, the other is lowered and vice versa, the plunger 19 being directly connected with the valve stem 15. A spring actuated load and fire mechanism is provided in connection with the plunger 19 which is cocked by swinging of the lever 17 to the left, raising the plunger 19 and lowering the plunger 18, and the mechanism is held cocked by a trigger arranged to be released by depression of a plunger 20 disposed parallel with the plunger 19 and directly behind the same. A dog 21 mounted on the side of the head 7 is arranged to depress the plunger 18 and there is a second dog 22 for depression of the plunger 19, and a third dog 23 for depression of the plunger 20. The parts are shown in neutral position with the head retracted, as at the end of a cycle of quick approach, feed, and quick return or reverse feed. In operation, as described in my patent mentioned above, the lever 17 is moved by hand to the left, lowering the plunger 18 and raising the plunger 19 sufficiently to bring the valve stem 15 to the rapid traverse or quick approach position, in which there is a full delivery of oil from the pump 13 to the right hand end of the cylinder 12. The spring of the load and fire mechanism associated with the plunger 19 is compressed in the raising of the plunger and the plunger is locked by a trigger. The quick approach of the head 7 continues until the dog 22 comes into engagement with the plunger 19 and forces it down to bring the valve stem 15 to the feed position, in which the pump 13 delivers a relatively small amount of fluid to the cylinder 12 for slow movement of the head. The head continues on its feed movement until the dog 23 depresses the plunger 20 to operate the trigger for release of the load and fire mechanism, and the plunger 19 is thereby moved downwardly to move the valve 14 past neutral position to rapid return position, in which there is a full delivery of oil from the pump 13 to the left hand end of the cylinder 12 for the quick return of the head 7. If desired, the movement of the plunger 19 downwardly may be limited to allow the valve stem 15 to move only as far as a reverse feed position, in which the pump delivers a relatively small amount of fluid to the cylinder for slow movement of the head, similarly as in forward feed. The depression of the plunger 19 by the load and fire mechanism results in raising of the plunger 18. When the head 7 reaches its fully retracted position, in which it is illustrated in the drawings, the dog 21 depresses the plunger 18 to raise the plunger 19 and the valve stem 15 with it to neutral position to stop the delivery of oil to the cylinder 12 and bring the head to rest. Now, it will be seen that with the mechanism thus far described, no variation in the feed movement of the head during travel is provided for, although there is a real need for slowing down or speeding up the feed of the head for certain machining operations; the only thing heretofore provided on a QS pump was a manual adjustment to provide for a specified feed rate which, of course, could not be automatically changed in the travel of the head. However, a slower feed is desired for facing or counterboring, as for example at the end of a drilling or boring operation, and a faster feed can be used in stepping from a bore of larger diameter to one of smaller diameter in drilling or boring work involving different diameters. This desired change in feed is secured by a two-feed control mechanism provided in accordance with my invention, as will now be described.

The pump 13, as indicated above, is a variable displacement pump, and has a regulating means in the form of a control shaft 24, the turning of which, as described in the Ferris patents mentioned above, changes the eccentricity of the pump pintle and accordingly changes the displacement of the pump to effect a change in the fluid delivery. A hand lever was ordinarily provided on the shaft 24 for setting the same for a given rate of fluid delivery, whereby to determine the feed of the head. If a slower or faster feed was desired the lever was set accordingly. However, this did not provide for any variation in the feed during the cycle of movements of the head. According to my invention the shaft 24 is shifted automatically from a position for one feed to a position for a different feed. The shaft 24, as illustrated in Figs. 2, 3 and 4, has a gear 25 fixed on the outer end thereof as by means of a pin 26 arranged to serve as a pointer as well as a means for limiting turning of the shaft. The pin 26 passes through the outer end of the hub of the gear 25 which projects through a hole 27 in a plate 28 suitably mounted on the front of the pump 13 by means of the boss 29 formed suitably integral with the plate. A graduated arcuate scale 30 is provided on the plate 28 in concentric relation to the hole 27, and the pointed end of the pin 26 is movable with respect thereto in the turning of the shaft 24. Two collars 31 and 32 are clamped on the plate 28, as by means of bolts 33 and 34 entered through an arcuate slot 35 formed in the plate concentric with the hole 27 and in opposed relation to the scale 30. The other end of the pin 26 is arranged to come into abutment with the collars 31 and 32 in the two positions which the shaft 24 is arranged to occupy. The collar 31 may be adjusted toward or away from the collar 32 to accordingly increase or decrease the low rate of feed and the collar 32 may be adjusted toward or away from the collar 31 to decrease or increase the high rate of feed. The pin 26 is shown in Figs. 1 and 2 in engagement with the collar 32 for the high rate of feed. A rack 36 is provided on a plunger 37 reciprocable in a guide 38 formed in the boss 29 whereby to turn the shaft 24 by means of the gear 25 by endwise movement of the plunger. The plunger has a piston portion 39 thereon reciprocable in a working cylinder 40. Two pipes 41 and 42 are arranged to deliver fluid to one end of the cylinder and simultaneously discharge fluid from the other end to communicate movement to the piston 39 for movement of the rack 36 in either direction as desired. The plunger 37 is formed with an extension 43 so that there will be no differential in the movement of the piston 39 in opposite directions, and of course, the plunger 37 and its extension 43 operate through stuffing boxes to prevent leakage of fluid under pressure. A pilot valve 44 in a valve body 45, mounted on the bed 5 just below the head 7, controls the delivery of oil under pressure from the pump 13 through a pipe 46 to either end of the cylinder 40. The pipe 46 communicates with the valve body 45 at a point intermediate the points of communication of the pipes 41 and 42 with said body and the valve 44 is provided with an annular groove 47 by means of which the pipe 46 is placed in communication with the pipe 42 when the valve 44 is in the one limit position shown in Fig. 1. The valve 44 establishes communication between the pipe 46 and pipe 41 when moved to its other limit position. When the pipe 46 communicates with pipe 42 the pipe 41 has direct communication with a drain 48, as indicated in Fig. 1, so that the plunger 37 is free to move to the left. When the pipe 46 is in communication with the pipe 41 the pipe 42 has communication with the drain 48 through a longitudinal hole 49 provided in the valve 44 in a manner thought to be easily understood from Fig. 1. The plunger 37, under such circumstances, is moved to the right. The drain pipe 48 returns the oil to the sump of the pump 13. The valve 44 has a stem 50 projecting from the valve body 45 and has a round head 51 on its upper end by means of which the same is arranged to be depressed by a dog 52 mounted on the side of the head 7 similarly as the dogs 21 and 22. A coiled compression spring 53 acting between the body 45 and head 51 serves normally to hold the pilot valve 44 in the position shown and, of course, the valve is depressed against the action of this spring and the spring serves to return the valve when the dog is retracted.

The pump 13, which, as stated before, is known as the Oilgear QS pump is disclosed in Patents #1,753,562 and #1,854,127 granted to the Oilgear Co., Milwaukee, Wisconsin. It will, therefore, suffice to describe the same by reference to Fig. 6 which shows diagrammatically that the same comprises a gear pump section G, and a piston pump section P, the two sections being preferably inside a single housing. The sump for the pump is indicated at S. 60 indicates a suction line leading from the sump to the gear pump G, and the latter primes the piston pump by delivery thereto from the discharge line 61. The piston pump P discharges through a line 62 communicating with the pressure port 63 of the valve 14, which, as stated before, has the reciprocable stem or control member 15 arranged to be moved endwise to different positions according to the oil delivery desired, the same being shiftable under control of the unit 16 on the machine. The valve is shown in feed position. In that position, oil is delivered from the pressure port 63 to line 64 leading to the right end of the cylinder 12. Oil in front of the piston in said cylinder is drained through line 65 communicating with the port 66 in this particular position of the valve. A high pressure relief valve 67 permits direct drainage of oil into the sump, but will not normally be opened and consequently the oil will find its way through the port 68 and passage 69 in the valve to the line 70 communicating with the discharge side of the gear pump. Thus, the oil drained from in front of the piston is supplied to the piston pump. Any excess oil is discharged through the line 71 and low pressure relief valve 72 into the sump. The valve 67 is provided to prevent trapping and is arranged to open at a certain pressure above that for which the valve 72 is set. The valve 73 is a high pressure relief valve for returning the discharge of the pump directly to the sump when there is no head movement. Now, when the head 51 on the stem of the valve 44 is depressed by a dog on the traveling head, oil delivered through pipe 46 to the valve 45 is discharged through the pipe 41 to move the piston 39 to the right and accordingly operate the rack 36 to turn the pinion 25. In that way, the eccentricity of the pump pintle p with respect to the rotor of the pump is changed and the fluid delivery is changed accordingly. This naturally affects the rate of movement of the head, although there has been no movement of the stem 15 of the valve 14. Further reference to the operation is made hereinafter.

In operation, the pilot valve 44 is normally in the position shown in Fig. 1 with the control shaft 24 of the pump 13 turned so that the pin 26, constituting the pointer for the scale 30, is in contact with the stop 32. This affords what may be called a normal feed rate, such that when the dog 22 depresses the plunger 19 to the feed position the head 7 will move at a rate predetermined by the setting of the stop 32 for, let us say, a drilling or boring operation. The normal feed of the head continues until the dog 52 depresses the head 51 to shift the pilot valve 44 against the action of the spring 53 to establish communication between the pipe 46 and pipe 41, whereby to move the plunger 37 to the right and accordingly turn the control shaft 24 of the pump counterclockwise to bring the pin 26 into engagement with the stop 31. This provides a different feed, in this case a slower feed, as for facing, counterboring, or the like. A sufficient dwell is provided on the dog 52 to keep the pilot valve 44 in the depressed position for a predetermined travel of the head, and at a predetermined point the dog 23 engages the plunger 20 to start the head on the return movement. In the return movement of the head the dog 52 leaves the head 51 and the pilot valve 44 is returned to the position shown, thereby bringing the control shaft 24 back to its initial position.

In Fig. 5 I have shown how the provision of four valves a, a', b and b', and suitable pipe connections, makes it possible to reverse the operation above described so that the control shaft 24 can be arranged normally to occupy a position for a low feed rate, and when the dog 52 encounters the head 51 to shift the pilot valve 44, the control shaft 24 will then be shifted to a position for a higher feed rate. With the valves a and a' closed and the valves b and b' opened, the operation as first described is secured, namely, a change from a high feed rate to a low feed rate upon operation of the pilot valve 44 by the dog 52. However, when the valves b and b' are closed and the valves a and a' are opened, a change is secured from a low feed rate to a high feed rate by operation of the pilot valve 44 by the dog 52, as is thought to be self-evident.

It is believed the foregoing description conveys a good understanding of all of the objects and advantages of my invention. The appended claims have been drawn with a view to covering all legitimate modifications and adaptations.

I claim:

1. In combination, a reciprocable device, relatively movable piston and cylinder means connected therewith to move the same, a variable capacity pump for supplying motive fluid to said cylinder, valve means for establishing communication between said pump and either end of said cylinder to cause operation in either direction, said valve means being arranged for automatic operation in the operation of said reciprocable device, means for changing the capacity of said pump, means operable automatically in the operation of said device to cause the operation of the capacity-changing means, and means interposed between the last-mentioned means and the capacity-changing means to reverse the operating relationship therebetween, said interposed means being manually operable independently of the operation of said device, whereby to secure different changes in pump capacity, as desired.

2. In combination, a reciprocable device, relatively movable piston and cylinder means connected therewith to move the same, a variable capacity pump for supplying motive fluid to said cylinder, valve means for establishing communication between said pump and either end of said cylinder to cause operation in either direction, said valve means being arranged for automatic operation in the operation of said reciprocable device, means for changing the capacity of said pump including a second piston and cylinder means arranged to have motive fluid delivered thereto, a valve for delivering motive fluid from said pump selectively to either end of the second cylinder, said valve being arranged to be operated automatically from one position to another in the operation of said device, whereby to change the pump capacity from high to low, and vice versa, and other valve means between the second cylinder and the last-mentioned valve operable manually independently of the operation of said device to reverse the operation of the capacity-changing means with respect to the positions of said valve, as desired.

3. In combination with a movable driven member, a primary fluid motor for imparting movement to said member, a pump for supplying fluid to said fluid motor, said pump being regulatable in fluid displacement whereby to vary the speed of movement of said driven member, a secondary fluid motor operable when energized to regulate the displacement of said pump, said secondary motor being reversible upon reversal of energizing fluid thereto and operative to respectively increase and decrease the displacement of said pump when driven in opposite directions, a fluid circuit for conducting energizing fluid to said secondary motor, valve means for reversing the flow of fluid in said circuit, means causing actuation of said valve means coincidentally with a predetermined movement of said driven member, and said circuit being manually adjustable to reverse the direction of fluid flow therein in response to actuation of said valve means.

4. The combination with a movable fluid driven member and a variable displacement pump disposed for the delivery of fluid to cause movement of said member at different speeds dependent upon the amount of such displacement, of a fluid energized motor in operative connection with said pump, said motor being movable in one direction to increase displacement of said pump and movable in the reverse direction to decrease such pump displacement, a fluid circuit including circuit adjusting means, a valve and a plurality of branches adapted to deliver energizing fluid to said motor, fluid delivered through one of said branches being effective to cause movement of said motor in one direction whereas fluid delivered through another of said branches being effective to cause a reverse movement of said motor, said valve being actuated as an incident to the movement of said driven member to direct the fluid through one of said branches to said motor, and the adjusting means of said circuit being manipulatable to predetermine which branch through which fluid shall be directed by said valve.

5. In combination, a reciprocable device, relatively movable piston and cylinder means connected therewith to move the same, a variable capacity pump for supplying motive fluid to said cylinder, valve means for establishing communication between said pump and either end of said cylinder to cause operation in either direction, said valve means being arranged for automatic operation in the operation of said reciprocable device, means for changing the capacity of said pump, means on said pump adjustable for predetermined limitation of the effect of said capacity changing means respecting said pump, means operable automatically in the operation of said device to cause the operation of the capacity-changing means, and means interposed between the last mentioned means and the capacity changing means to reverse the operating relationship therebetween, said interposed means being manually operable independently of the operation of said device, whereby to secure different changes in pump capacity, as desired.

6. In combination, a reciprocable device, relatively movable piston and cylinder means connected therewith to move the same, a variable capacity pump for supplying motive fluid to said cylinder, valve means for establishing communication between said pump and either end of said cylinder to cause operation of the piston and cylinder means in either direction, said valve means being arranged for automatic operation in the operation of said reciprocable device, a rotatable control shaft for regulating the capacity of said pump, stop members spaced circumferentially of said shaft, an indicator member carried by the shaft, means including a second cylinder and piston therein movable to rotate said control shaft for changing the capacity of said pump, said second cylinder being arranged to have motive fluid delivered thereto to cause such movement of the piston, said indicator being disposed to abut said stop members whereby to limit the movement of said piston and the rotation of said control shaft, a valve for directing motive fluid from said pump selectively to either end of the second cylinder, said valve being arranged to be operated automatically from one position to another in the operation of the device, and other valve means between the second cylinder and the last mentioned valve and operable manually independently of the operation of said device to reverse the operation of the capacity-changing means with respect to the positions of said last mentioned valve, as desired.

7. The combination with a movable fluid driven member and a variable displacement pump disposed for the delivery of fluid to cause movement of said member at different speeds dependent upon the amount of such displacement, of a control shaft rotatable in opposite directions to respectively increase and decrease the displacement of said pump, an indicator member on said shaft, stop members independently adjustable circumferentially of said shaft, a fluid energized motor movable in opposite directions to impart rotative movement to said control shaft in such opposite directions, said indicator member being disposed for abutment with said stop members for limiting the movement of said motor and of said shaft thereby limiting the displacement change of said pump, a fluid circuit including a valve and a plurality of conduits for the delivery of fluid to said motor, said motor being responsive for movement in said opposite directions incident to fluid delivery thereto through different of said conduits, means operable automatically in the movement of said fluid driven member to shift the position of said valve, said valve being operable in the different positions to direct fluid to said motor through different of said conduits, and manual means adjustable of said circuit to alter the conduits to which fluid is directed by an actuation of said valve.

8. The combination with a movable driven member and a variable displacement pump disposed for the delivery of fluid to transmit energy for causing movement of said member at different speeds dependent upon the amount of such displacement, of a motor in operative connection with said pump, said motor being actuative in one manner to adjust said pump for increased displacement and actuative in a different manner to adjust said pump for decreased displacement, a control circuit for conducting actuating energy to said motor, said circuit including circuit adjusting means, circuit opening and closing means and a plurality of branches adapted to deliver energy to said motor, energy delivered through one of said branches being effective to cause actuation of said motor to effect decreased pump displacement whereas energy delivered through another of said branches being effective to cause such motor actuation as to effect increased pump displacement, said circuit opening and closing means being actuated as an incident to the movement of said driven member to admit energy for passing through one of said circuit branches to said motor, and said circuit adjusting means being manipulatable to predetermine through which branch the energy admitted by said circuit opening and closing means shall be directed.

9. The combination with a movable driven member and a variable output energy generator disposed for the delivery of energy for causing movement of said driven member at a speed variable with the amount of energy delivered, of a motor in operative connection with said generator, said motor being actuatable in one manner to adjust said generator for increased energy output and in a different manner to adjust said generator for decreased energy output, a control circuit for conducting actuating energy to said motor, said circuit including circuit adjusting means and circuit opening and closing means for controlling the flow of energy into said circuit, said opening and closing means being actuated as an incident to the movement of said driven member to permit the flow of energy through said circuit for causing actuation of said motor, and said circuit adjusting means being manually manipulatable to predetermine in which manner the motor shall be actuated.

RAYMOND A. CARLSON.